United States Patent [19]

Takahashi

[11] Patent Number: 4,654,413

[45] Date of Patent: Mar. 31, 1987

[54] MANUFACTURING OF HIGH MOLECULAR WEIGHT POLYESTER

[75] Inventor: Katsuhiko Takahashi, Fuji, Japan

[73] Assignee: Polyplastics Co., Ltd., Japan

[21] Appl. No.: 811,584

[22] Filed: Dec. 20, 1985

[30] Foreign Application Priority Data

Dec. 28, 1984 [JP] Japan ................................ 59-276426

[51] Int. Cl.$^4$ ................................................ C08G 63/26
[52] U.S. Cl. ..................... 528/274; 528/275; 528/276; 528/277; 528/485; 528/486; 528/489
[58] Field of Search ............... 528/274, 275, 276, 277, 528/485, 486, 489

[56] References Cited

U.S. PATENT DOCUMENTS

| | | | |
|---|---|---|---|
| 4,043,971 | 8/1977 | Wurmb et al. | 524/601 |
| 4,163,002 | 7/1979 | Pohl et al. | 528/274 |
| 4,351,758 | 9/1982 | Lu | 524/227 |
| 4,391,938 | 7/1983 | Memon et al. | 524/270 |
| 4,460,731 | 7/1984 | Kochanowski et al. | 524/451 |
| 4,532,319 | 7/1985 | Wendling | 528/274 |
| 4,536,531 | 8/1985 | Ogawa et al. | 524/135 |

Primary Examiner—Lucille M. Phynes
Attorney, Agent, or Firm—Andrew F. Sayko, Jr.

[57] ABSTRACT

A polybutylene terephthalate is manufactured by the steps of polycondensating in the liquid phase terephthalic acid or a lower alcohol ester thereof as the acid component and 1,4-butanediol as the diol component to obtain a prepolymer of polybutylene terephthalate, solidifying the prepolymer and further polymerizing the prepolymer in the solid phase to obtain a polybutylene terephthalate of a higher polymerization degree, 0.001 to 5 percent by weight, based on the prepolymer, of a nucleator being added to the polymerization mixture at any time during a period of from the monomer-mixing stage before the starting of the solid phase polymerization, the solid phase polymerization being conducted in the presence of the nucleator uniformly dispersed in the polymerization mixture. The solid polymerization can be treated subsequently to the liquid polymerization and can proceed in a short time.

6 Claims, No Drawings

MANUFACTURING OF HIGH MOLECULAR WEIGHT POLYESTER

The present invention relates to a method of manufacturing by solid phase polycondensation of high molecular weight polyesters mainly comprising polybutylene terephthalate and more particularly, it provides a manufacturing method for obtaining highly polymerized polybutylene terephthalate efficiently and economically.

STATEMENT OF PRIOR ARTS

While polybutylene terephthalate, because of its excellent moldability and physical properties, is finding wide uses in the field of plastics for industrial uses including automobile parts, electric appliance parts, gears, etc., its mechanical properties are highly dependent on the degree of polymerization of the starting polymer and, therefore, it is essential to manufacture a highly polymerized polymer and to achieve this manufacture economically by whatever means for polybutylene terephthalate to be used as a preferable starting polymer in the field of industrial plastics where excellent mechanical properties, strength in particular, are demanded. This is a technical problem which is still open.

Conventional methods of manufacturing highly polymerized polybutylene terephthalate include one wherein the latter half of the polycondensation reaction is carried out in a solid phase.

According to this method, generally, the polycondensation is conducted in a molten state by the conventional method; the sticky molten polymer is taken out of the polycondensator and cooled to solifity; the solidifed molten polymer is ground; the ground polybutylene terephthalate (prepolymer) is dried for a substantial period of time to crystallize and held at a temperature lower than its melting point by 5° to 60° C. to carry out solid phase condensation, thereby manufacturing polyester. In this final manufacturing stage, an increase in the molecular weight proceeds in the solid phase and especially high molecular weights may be attained under appropriate reaction conditions.

In the conventional solid phase polymerization process, the drying the crystallization are of indispensable importance as pretreatments and, therefore, a long time was required for solid phase polymerization, resulting in low productivity and high polymer cost.

Under these circumstances, the present inventors have arrived at this invention as a result of assiduous studies on the attainment of a high degree of polymerization and low cost in order to perform at high efficiency the solid phase polymerization of polyester mainly comprising polybutylene terephthalate.

SUMMARY OF THE INVENTION

According to the invention, a polybutylene terephthalate is manufactured by the steps of polycondensating in the liquid phase terephthalic acid or a lower alcohol ester thereof as the acid component and 1,4-butanediol as the diol component to obtain a prepolymer of polybutylene terephthalate, solidifying the prepolymer and further polymerizing the prepolymer in the solid phase to obtain a polybutylene terephthalate of a higher polymerization degree, 0.001 to 5 percent by weight, based on the prepolymer, of a nucleator being added to the polymerization mixture at any time during a period of from the monomer-mixing stage before the starting of the solid phase polymerization, the solid phase polymerization being conducted in the presence of the nucleator uniformly dispersed in the polymerization mixture. It is preferred that said nucleator is added at any time until an intrinsic viscosity of the polymerization mixture has reached 0.5. The nucleator is preferably fine powder of boron nitride, a silicate, a metal carbonate, a sulfate, an inorganic metal oxide, a metal salt of an aliphatic (C9 to C30) carboxylic acid, a metal salt of an aromatic carboxylic acid, a metal salt of a polyoxyalkylene carboxylic acid, a metal salt of an olefin-acrylic acid copolymer, an alkali metal chelate compound of acetylacetone or an organic nucleator compound.

In other words, the invention is a method of manufacturing highly polymerized polybutylene terephthalate by the solid phase polymerization process in which polybutylene terephthalate obtained by the liquid phase polycondensation of an acid component mainly comprising terephthalic acid or its lower alcohol esters with a diol component mainly comprising 1,4-butanediol is solidified and further subjected to polymerization treatment in a solidified state, characterized in that 0.001 to 5% by weight of a nucleator based on the polycondensate is added thereto prior to the solid phase polymerization and at an arbitrary period after the monomer mixing stage in the liquid phase polycondensation but before the initiation of the solid phase polymerization and the solid phase polymerization is performed in the homogeneous presence of the nucleator.

The polybutylene terephthalate referred to in this invention may contain up to 10 mol % of other comonomers. They include, for example, glycol components such as ethylene glycol, propylene glycol, hexamethylene glycol, and bisphenol A, discarboxilic acids such as isophthalic acid, naphthalenedicarboxilic acid, and adipic acid, and polyfunctional compounds such as pentaerythritol, trimethylolpropane, trimellitic acid, pyromellitic acid, hydroxybenzoic acid, and hydroxynaphthoic acid.

The liquid phase polycondensation is conducted according to the ordinary method wherein esterification or ester exchange reaction is followed by polycondensation.

The esterification reaction of terephthalic acid with 1,4-butanediol (hereinafter referred to as "1,4 BG") is normally performed with the ratio of 1 to 5 mol of 1,4 BG to 1 mol of terephthalic acid under normal or enhanced pressure and at a temperature of 200° to 240° C., while continuously removing the water formed. Here, the presence of a catalyst such as a titanium compound, is often advantageous.

The ester exchange reaction is normally performed with dimethyl terephthalate (hereinafter referred to as "DMT") and 1, 4 BG at a mole ratio of from 1:1 to 1:2 under normal pressure and at a temperature of 150° to 220° C., while removing methanol formed. To achieve a practically effective reaction rate, the use of a catalyst is necessary. Examples of the catalyst include titanium compounds, lead oxide, lead acetate, zinc oxide, zinc acetate, and manganese acetate. Especially, organic titanates and hydrolyzates or alcoholyzates of titanium tetrachloride are preferable. For example, they include, preferably, organic titanates like tetrabutyl titanate, tetrapropyl titanate, tetraethyl titanate, and tetramethyl titanate, and their hydrolyzates, inorganic titanium compounds like hydrolysates of titanium tetrachloride and titanium sulfate, titanium potassium fluoride, titanium zinc fluoride, etc., and other titanium compounds well known as catalysts for polyester manufacture such as titanium oxalate, and titanoum potassium oxalate.

Especially preferable are hydrolyzates of tetrabutyl titanate, tetrapropyl titanate and titanium tetrachloride.

The amount in terms of Ti of such a catalyst used should be 10 to 1,000 ppm of polymer, preferably, 30 to 300 ppm. The addition of the catalyst may be made in several portions during the reaction, as required.

In the polycondensation reaction, the product obtained by the aforementioned esterification or ester exchange reaction is subjected to melt polycondensation at 200° to 260° C. under reduced pressure in the reaction system, while continuously removing 1, 4 BG and by products, until the desired polymerization is achieved, thereby yielding the prepolymer. In order to achieve a practically useful reaction rate in the polycondensation reaction, the use of a catalyst is necessary.

The catalysts which can be used herein include those used in the aforementioned esterification or ester exchange reaction and it is practicable further to add one or more of them before initiating the polycondensation reaction for improvement of the rate of polycondensation reaction.

The polycondensate (prepolymer) obtained by the liquid phase polymerization (melt polymerization) is taken out of the reactor, solidified, and ground or granulated to be subjected to the solid phase polymerization.

The characteristic feature of this invention consists in adding 0.001 to 5% by weight of a nucleator at an arbitrary period after the monomer preparation stage but before the solid phase polymerization. The period of the nucleator addition may be any one before the initiation of the solid phase polymerization, but it is essential that the nucleator is finely powdered and homogeneously dispersed, when the solid phase polymerization is performed; to ensure this, it should be added at the first half of the liquid phase polymerization period or before the polycondensation when the viscosity of the reaction system begins to rise, that is, during the period from the monomer mixing stage to the completion of the esterification or ester exchange reaction, so that it has already been added in the reaction system at the time of polycondensation, desirably to be homogeneously dispersed, taking advantage of the shearing force generated as the viscosity rises. It is also feasible to add the nucleator after the melt polymerization and before entering the solid phase polymerization and homogeneously disperse it by kneading in an extruder, etc., but this method is undersirable because of the interposition of the extrusion and kneading processes.

Well-known nucleators normally employed for improving the moldability of polyester are used in this invention. They include, for example, boron nitride, talc, kaolin, bentonite, clay, graphite, asbestos, silica, silicates like calcium silicate, metal carbonates like calcium carbonate and magnesium carbonate, sulfates like calcium sulfate and barium sulfate, inorganic oxides like titanium oxide, calcium oxide, aluminum oxide, molybdenum oxide and silicon oxide, metal salts of higher aliphatic mono- or di-carboxylic acids having 9 to 30 carbon atoms, like lauric acid, myristic acid, palmitic acid, oleic acid, stearic acid and montanic acid, metal salts of aromatic mono- and di-carboxylic acids like benzoic acid and phthalic acid, or aromatic alkyl mono- and di-carboxylic acids or their delivatives, metal salts of carboxilic acids having polyoxyalkylene groups, metal salts of olefin-acrylic acid copolymers, alkali metal chelates of acetylacetone, and aromatic organic compounds like benzophenone, oxybenzoate and polyarylene esters. These compounds may be used singly or two or more of them jointly used.

The metals of the aforementioned metal salt compounds should preferably be, but not restricted to, alkali or alkaline earth metals such as sodium, lithium, calcium, magnesium or barium.

Of the aforementioned nucleators, the one especially desirable for the method of this invention is boron nitride.

The aforementioned nucleators, if in the form of solid particles, are the more effective, the smaller the final particle diameter; they should be smaller than at least 100μ, preferably smaller than several μ or further preferably smaller than 1μ. According to this invention, the shearing force generated during the polycondensation reaction due to the high viscosity of the reaction system is effective in dispersing the particles finely and homogeneously in diameter and it is only natural that the nucleator should desirably be pulverized into fine particles before added to the reaction system.

The amount of the nucleator used according to this invention should be in the range of 0.001 to 5% by weight, depending on the type, particularly preferably 0.005 to 3% by weight.

Besides, well-known stabilizers, such as sterically hindered phenol or phosphorus compounds, etc., may be added during the monomer mixing stage or the liquid phase polycondensation.

The polybutylene terephthalate prepolymer which has been melt-polymerized in the presence of the nucleator has intrinsic viscosities on the order of 0.5 to 1.2; it is then solidified by cooling and subjected to the solid phase polymerization after being crushed or granulated. The solidification by cooling is conducted by ordinary methods. For example, the prepolymer delivered from the melting reactor in the shape of sheet or strand is solidified by cooling by way of passing through air current or water and then crushed or cut. It is advantageous to produce granules having as uniform size as possible, so that an increase in the moleculer weight should be made uniformly during the sdlid phase condensation. Desirable particle diameters should be 1 to 5 mm. According to the method of this invention, immediately thereafter, the granules may be transferred to a solid phase polymerization reactor which is adjusted to an appropriate temperature, to effect the solid phase polymerization.

In the conventional solid phase polymerization method wherein no nucleator is used, pretreatments such as drying or crystallization, by holding the prepolymer at an appropriate temperature (120° to 180° C.) for a long time (3 to 6 hr) are required before the solid phase polymerization should be conducted. Otherwise, polymer particles will mutually fuse together, forming agglomerates during the solid phase polymerization or the polymerization in the solid phase will barely proceed or will be very slow, taking long time as a whole. In contrast, when the nucleator is added and homogeneously dispersed at the time of melt polymerization, as in the method of this invention, no fusion of polymer particles occurs and a sufficiently highly polymerized polymer can be obtained at high efficiency, even when such pretreatments are omitted, so that the productivity can be improved through simplification of the process, curtailment of the time, etc., and the economic advantage achieved is remarkable. Even in the method of this invention, drying or storing, if required for production, is not prohibited.

The solid phase polymerization of the method of this invention can be performed by commonly known methods except for dispensing with pretreatments such are preliminary crystallization.

Thus, after the melt polymerization, the solidified and ground intermediate condensate (as the case may be, after removing excess liquid cooling medium present on the surface of the formed particles) with an intrinsic viscosity of 0.5 to 1.2 is directly put in a reactor held at a temperature lower than its melting point by 5° to 60° C. This reactor, being provided with adequate gas inlet, exhaust port and an appropriate vacuum coupler, is suitable for making solid phase condensation. For example, the solid phase condensation may be performed in this reactor in an inert gas current or in vacuum. The reactor used in this manufacturing method is well known per se and is not critical in this invention, and therefore its detailed description is omitted; either batch type or continuous type is usable; anyway, it is only proper that such a reactor permits the intermediate condensate to stay therein until the intended intrinsic viscosity is obtained and is capable of maintaining a uniform reaction temperature; the desired viscosity may be appropriately controlled through the adjustment of residence time and treating temperature.

(Effects of the Invention)

The effects of this invention, as is clear from that has already been described, are such that, with the nucleator added during the liquid phase polymerization, particularly, at the time of mixing raw materials or at a stage before the reactants come to have high viscosities through polycondensation, it is treated for long under the shearing force of the high viscosity molten polymer before the polycondensation is accomplished; therefore, it affords very fine particles which are homogeneously dispersed, so that the nucleating action may be bolstered and a high degree of crystallinity can be achieved, without necessitating such pretreatments as crystallization, after cooling and grinding; accordingly, even when the transition to the solid phase polymerization is immediately made, no fusion of the polymer particles will occur, permitting highly polymerized polymer to be produced at high efficiency and in short time; as a result, the simplification of the process and the curtailment of the time, will bring about a large economic advantage.

It is well known that the addition of the nucleator promotes crystallization, aids in the mold releasing operation, improves the molding cycle and ameliorates the physical properties of the molded articles and, to be sure, the solid phase polymer obtained by the method of this invention also is provided with such usually known moldability effect and this effect is also enhanced through the homogeneous dispersion, as compared with the conventional method of addition; but it has still other characteristic effects which rest with the discovery that the nucleator effect can be very effectively utilized, aside from the moldability, for improvement of economy through an increase in the polymerization rate and rationalization of the process as described above in the solid phase polymerization and the method of manufacturing high molecular weight polybutylene terephthalate based on this discovery. Such a solid phase polymerization process has heretofore been not known at all.

(Examples)

In the following, examples of this invention will be described, though this invention is by no means bound thereby.

EXAMPLES 1 TO 16 AND COMPARATIVE EXAMPLE 1

Into a reactor having a stirror, nitrogen inlet and a separating column, 100 parts by weight of dimethyl terephthalate, 95 parts by weight of 1,4-butanediol and 0.06 part by weight of titanium tetraisopropylate was fed, with various types of nucleators in amounts shown in Table 1 added in a state of suspension and dispersion, using part of the aforementioned 1,4-butanediol. About 90% of the theoretical amount of methanol formed within 15 hours was distilled off, while introducing nitrogen under stirring. The temperature of the reaction mixture rose to 200° C. Then the mixture was transferred to a second reactor, which was evacuated to 0.5 mmHg within 1.0 hour and simultaneously therewith, the reaction temperature was raised to 255° C. Two hours later, the reaction was completed; then, the molten product was extruded from an ejector port as strand; this strand was cooled with water; the adherent water was removed by passing it through hot air and the product was cut into a colorless cylindrical granule of a size 2×3 mm. The intrinsic viscosity of this prepolymer was on the order of 0.75 to 0.80. The granular prepolymer was put in a rotary flask immersed in an oil bath held at 200° C. and the granules were stirred and mixed, while turning the flask and keeping a vacuum of 0.3 mmHg, thereby carrying out the solid phase polymerization for about 6 hours.

The intrinsic viscosities of the solid-phase-polymerized polymers thus obtained are depicted in Table 1.

For comparison, values obtained without addition of the nucleator are also listed in Table 1.

TABLE 1

| | Type of nucleator | Amount of addn. (% by wt. of polymer) | Intrinsic viscosity after solid phase polymerization |
|---|---|---|---|
| Comp. Ex. 1 | — | 0 | 0.95 |
| Example 1 | boron nitride | 0.005 | 1.18 |
| Example 2 | " | 0.010 | 1.48 |
| Example 3 | " | 0.10 | 1.58 |
| Example 4 | talc | 0.10 | 1.02 |
| Example 5 | " | 0.5 | 1.18 |
| Example 6 | " | 1.0 | 1.30 |
| Example 7 | fine powder silica | 0.010 | 1.10 |
| Example 8 | " | 0.100 | 1.38 |
| Example 9 | calcium carbonate | 2.0 | 1.12 |
| Example 10 | barium sulfate | 2.0 | 1.15 |
| Example 11 | sodium laurate | 1.0 | 1.23 |
| Example 12 | barium laurate | 1.0 | 1.21 |
| Example 13 | calcium stearate | 1.0 | 1.03 |
| Example 14 | calcium montanate | 1.0 | 1.15 |
| Example 15 | sodium benzoate | 1.0 | 1.22 |
| Example 16 | metal salts of ethylene-methacrylic acid copolymer | 1.0 | 1.31 |

*Trade name: Aerosil #200, manufactured by DEGUSSA
**Trade name: Surlyn, manufactured by E. I. du Pont

EXAMPLES 17 TO 24 AND COMPARATIVE EXAMPLE 1

The melt polycondensation was performed under exactly the same conditions as in the aforementioned examples, except that the addition of the nucleator in the liquid phase polymerization was made at the time of transfer from the aforementioned first reactor to the second reactor (that is, after the ester exchange reaction and before the polycondensation reaction). In this instance, the intrinsic viscosity of the prepolymer was 0.75 to 0.80. Thereafter, it was subjected to the solid phase polymerization exactly in the same manner as described above.

The intrinsic viscosities of the polymers after the solid phase polymerization are given in Table 2.

TABLE 2

|  | Type of nucleator | Amount of addn. (% by wt. of polymer) | Intrinsic viscosity after solid phase polymerization |
|---|---|---|---|
| Comp. Ex. 1 | — | 0 | 0.96 |
| Example 17 | boron nitride | 0.005 | 1.16 |
| Example 18 | " | 0.010 | 1.50 |
| Example 19 | talc | 1.0 | 1.28 |
| Example 20 | fine powder silica | 1.100 | 1.35 |
| Example 21 | calcium carbonate | 2.0 | 1.10 |
| Example 22 | sodium laurate | 1.0 | 1.25 |
| Example 23 | calcium montanate | 1.0 | 1.18 |
| Example 24 | metal salts of ethylene-methacrylic acid copolymer | 1.0 | 1.30 |

*Trade name: Aerosil #200, manufactured by DEGUSSA
**Trade name: Surlyn, manufactured by E. I. du Pont

EXAMPLES 25 AND 26 AND COMPARATIVE EXAMPLE 2

The granular prepolymer (intrinsic viscosity: 0.76) obtained by melt polymerization under exactly the same conditions as in Examples 3 and 6 was fed to the top of a longitudinally cylindrical solid phase reactor with a jacket (through which 220° C. heating medium passed) through a preheater (staying for 30 min), heeped to a specified level in the reactor so as to hold it for a specified residence time, and drawn out from the bottom, while nitrogen dried and held at 270° C. was fed in from the bottom and discharged from the top, whereby continuous solid phase polymerization was carried out in a nitrogen current. The internal temperature of the reaction system was 210° C. at its top, 213° C. at its middle part, and 215° C. at its bottom, while the residence time was about 8 hours. The intrinsic viscosities of the solid-phase-polymerized polymers thus obtained are shown in Table 3. Values obtained by exactly the similar operation without addition of nucleators are also listed in this table for comparison.

TABLE 3

|  | Type of nucleator | Amount of addn. (% by wt. of polymer) | Intrinsic viscosity after solid phase polymerization |
|---|---|---|---|
| Comp. Ex. 2 | — | 0 | 0.98 |
| Example 25 | boron nitride | 0.01 | 1.51 |
| Example 26 | talc | 1.0 | 1.32 |

The embodiments of the invention in which an exclusive privilege or property is claimed are defined as follows:

1. A process for manufacturing a polybutylene terephthalate, which comprises the steps of polycondensating in the liquid phase terephthalic acid or a lower alcohol ester thereof as the acid component and 1,4-butanediol as the diol component to obtain a prepolymer of polybutylene terephthalate, solidifying the prepolymer and further polymerizing the prepolymer in the solid phase to obtain a polybutylene terephthalate of a higher polymerization degree, 0.001 to 5 percent by weight, based on the prepolymer, of a nucleator being added to the polymerization mixture at any time during a period of from the monomer-mixing stage before the starting of the solid phase polymerization, the solid phase polymerization being conducted in the presence of the nucleator uniformly dispersed in the polymerization mixture.

2. A process as claimed in claim 1, in which said nucleator is added at any time until an intrinsic viscosity of the polymerization mixture has reached 0.5.

3. A process as claimed in claim 1, in which said nucleator is fine powder of boron nitride, a silicate, a metal carbonate, a sulfate, an inorganic metal oxide, a metal salt of an aliphatic (C9 to C30) carboxylic acid, a metal salt of an aromatic carboxylic acid, a metal salt of a polyoxyalkylene carboxylic acid, a metal salt of an olefin-acrylic acid copolymer, an alkali metal chelate compound of acetylacetone or an organic nucleator compound.

4. A process as claimed in claim 1, in which said nucleator has a particle size of 100 microns or smaller.

5. A process as claimed in claim 1, in which said nucleator is fine powder of boron nitride.

6. A process as claimed in claim 1, in which the solid phase polymerization is carried out after the prepolymer cooled and solidified has been crushed into granules.

* * * * *